(12) United States Patent
MacCallum et al.

(10) Patent No.: US 10,751,630 B2
(45) Date of Patent: *Aug. 25, 2020

(54) FANTASY SPORTS MANAGER FOR VARIOUS DEVICES

(71) Applicants: Michael Neil MacCallum, Rochester Hills, MI (US); Mark Aleksander Jotanovic, Birmingham, MI (US); Marco Joseph Gatti, Grosse Ile, MI (US)

(72) Inventors: Michael Neil MacCallum, Rochester Hills, MI (US); Mark Aleksander Jotanovic, Birmingham, MI (US); Marco Joseph Gatti, Grosse Ile, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/251,630

(22) Filed: Jan. 18, 2019

(65) Prior Publication Data
US 2019/0151763 A1    May 23, 2019

Related U.S. Application Data

(63) Continuation of application No. 14/302,931, filed on Jun. 12, 2014, now Pat. No. 10,183,224.

(51) Int. Cl.
| | | |
|---|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/828* | (2014.01) |
| *A63F 13/35* | (2014.01) |
| *A63F 13/65* | (2014.01) |
| *A63F 13/332* | (2014.01) |

(52) U.S. Cl.
CPC .......... *A63F 13/828* (2014.09); *A63F 13/332* (2014.09); *A63F 13/35* (2014.09); *A63F 13/65* (2014.09)

(58) Field of Classification Search
USPC .................... 463/2, 4, 20, 22, 25, 39, 40, 42
See application file for complete search history.

(56) References Cited

U.S. PATENT DOCUMENTS

| | | | |
|---|---|---|---|
| 6,135,881 | A | 10/2000 | Abbott et al. |
| 6,193,610 | B1 | 2/2001 | Junkin |
| 6,371,855 | B1 | 4/2002 | Gavriloff |
| 7,458,093 | B2 | 11/2008 | Dukes et al. |
| 7,699,707 | B2 | 4/2010 | Bahou |

(Continued)

*Primary Examiner* — Adetokunbo O Torimiro
(74) *Attorney, Agent, or Firm* — Brooks Kushman P.C.

(57) ABSTRACT

A fantasy sports management system includes a wireless transceiver and a processor. the wireless transceiver is configured to communicate sports-related information to a mobile device that includes a fantasy sports management application. The processor is in communication with the wireless transceiver. Real-time sports information is received from the fantasy sports management application on the mobile device. An input is received requesting the fantasy sports management application to suggest a starter for a roster of the mobile device user. Roster information is received relating to the user and other users' fantasy sports teams. A determination is made regarding whether the rosters of the user and the other users are substantially similar. If they are, a suggestion of changing the user's roster is made and sent so that the user has the ability to change his roster to more aligned with the roster of the other users.

10 Claims, 10 Drawing Sheets

(56) References Cited

U.S. PATENT DOCUMENTS

| | | |
|---|---|---|
| 7,762,878 B2 | 7/2010 | Nicholas et al. |
| 7,988,560 B1 | 8/2011 | Heller et al. |
| 8,028,315 B1 | 9/2011 | Barber |
| 8,056,099 B2 | 11/2011 | Shanks et al. |
| 8,210,918 B2 | 7/2012 | Nicholas et al. |
| 8,239,891 B2 | 8/2012 | Hughes et al. |
| 8,246,433 B2 | 8/2012 | Lore |
| 8,296,794 B2 | 10/2012 | Hughes et al. |
| 8,315,722 B1 | 11/2012 | Russo |
| 8,388,445 B2 | 3/2013 | Pavlich et al. |
| 8,397,257 B1 | 3/2013 | Barber |
| 8,403,756 B2 | 3/2013 | Baray et al. |
| 8,447,420 B2 | 5/2013 | Bloodworth |
| 8,516,374 B2 | 8/2013 | Fleischman et al. |
| 8,522,300 B2 | 8/2013 | Relyea et al. |
| 8,584,174 B1 | 11/2013 | Fyock et al. |
| 8,670,847 B2 | 3/2014 | Sloan et al. |
| 8,678,930 B2 | 3/2014 | Gabrail et al. |
| 8,769,600 B2 | 7/2014 | Relyea et al. |
| 9,138,652 B1 | 9/2015 | Thompson et al. |
| 9,351,048 B1 | 5/2016 | Feldstein et al. |
| 2002/0107073 A1 | 8/2002 | Binney |
| 2003/0054885 A1 | 3/2003 | Pinto et al. |
| 2006/0040719 A1 | 2/2006 | Plimi |
| 2006/0064184 A1 | 3/2006 | Ream et al. |
| 2006/0105827 A1 | 5/2006 | Metzger et al. |
| 2008/0026804 A1 | 1/2008 | Baray et al. |
| 2008/0062318 A1 | 3/2008 | Ellis et al. |
| 2008/0096664 A1 | 4/2008 | Baray et al. |
| 2008/0287198 A1 | 11/2008 | Callery et al. |
| 2009/0156311 A1 | 6/2009 | Ng et al. |
| 2010/0210331 A1 | 8/2010 | Hughes et al. |
| 2010/0311484 A1 | 12/2010 | Suh et al. |
| 2011/0145881 A1 | 6/2011 | Hartman et al. |
| 2011/0230243 A1 | 9/2011 | Hereford |
| 2011/0237317 A1 | 9/2011 | Noonan et al. |
| 2011/0256911 A1 | 10/2011 | Heller et al. |
| 2012/0149472 A1 | 6/2012 | Miller |
| 2012/0214602 A1 | 8/2012 | Ahlstrom |
| 2012/0220375 A1 | 8/2012 | Williams |
| 2012/0231890 A1 | 9/2012 | Junkin et al. |
| 2013/0013092 A1 | 1/2013 | Lang et al. |
| 2013/0158688 A1 | 6/2013 | Barber |
| 2014/0011573 A1 | 1/2014 | Amaitis et al. |
| 2014/0287831 A1 | 7/2014 | Nicholas et al. |
| 2014/0194173 A1 | 9/2014 | Relyea et al. |

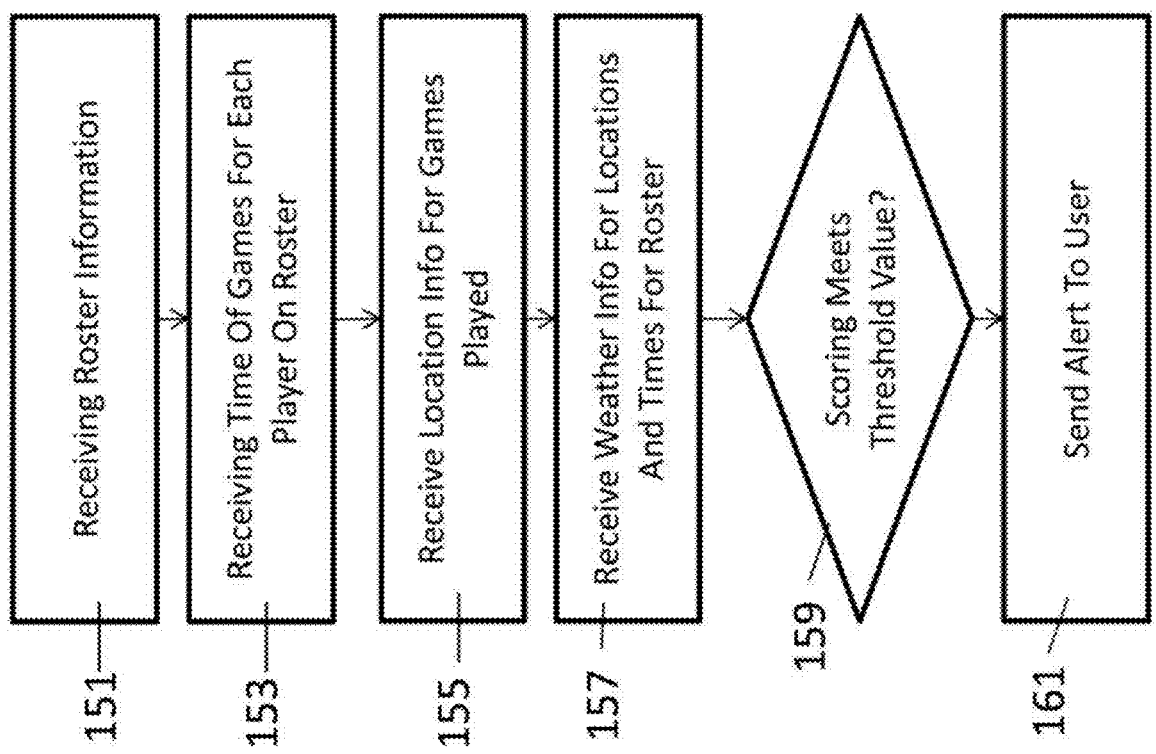

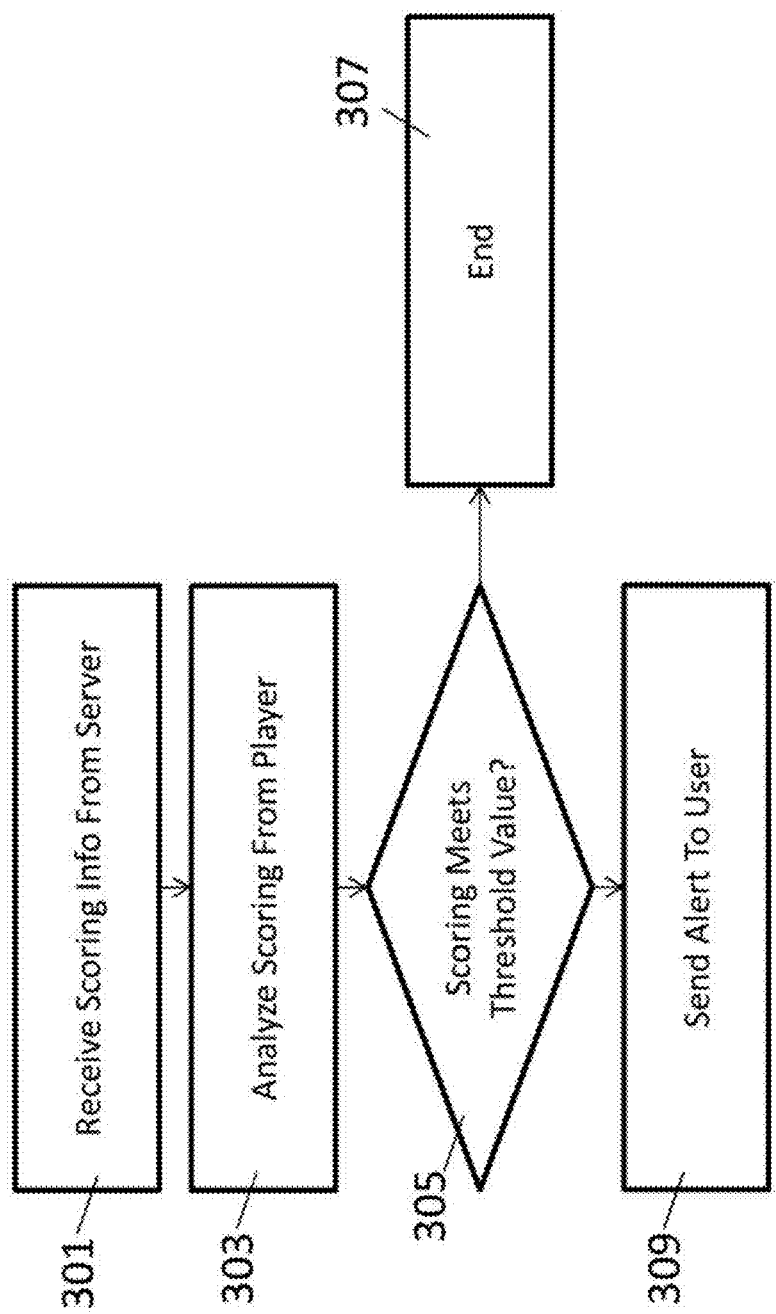

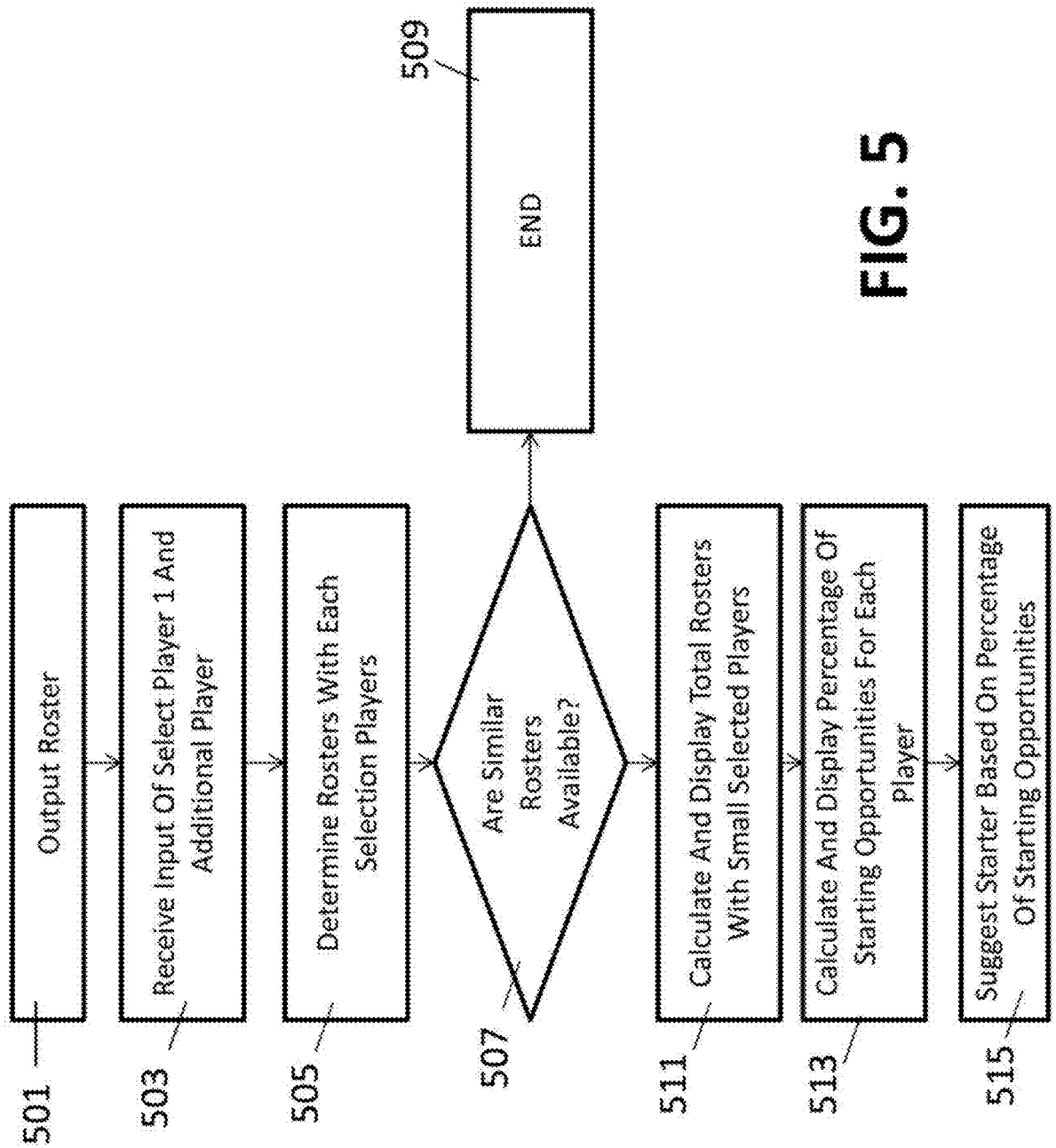

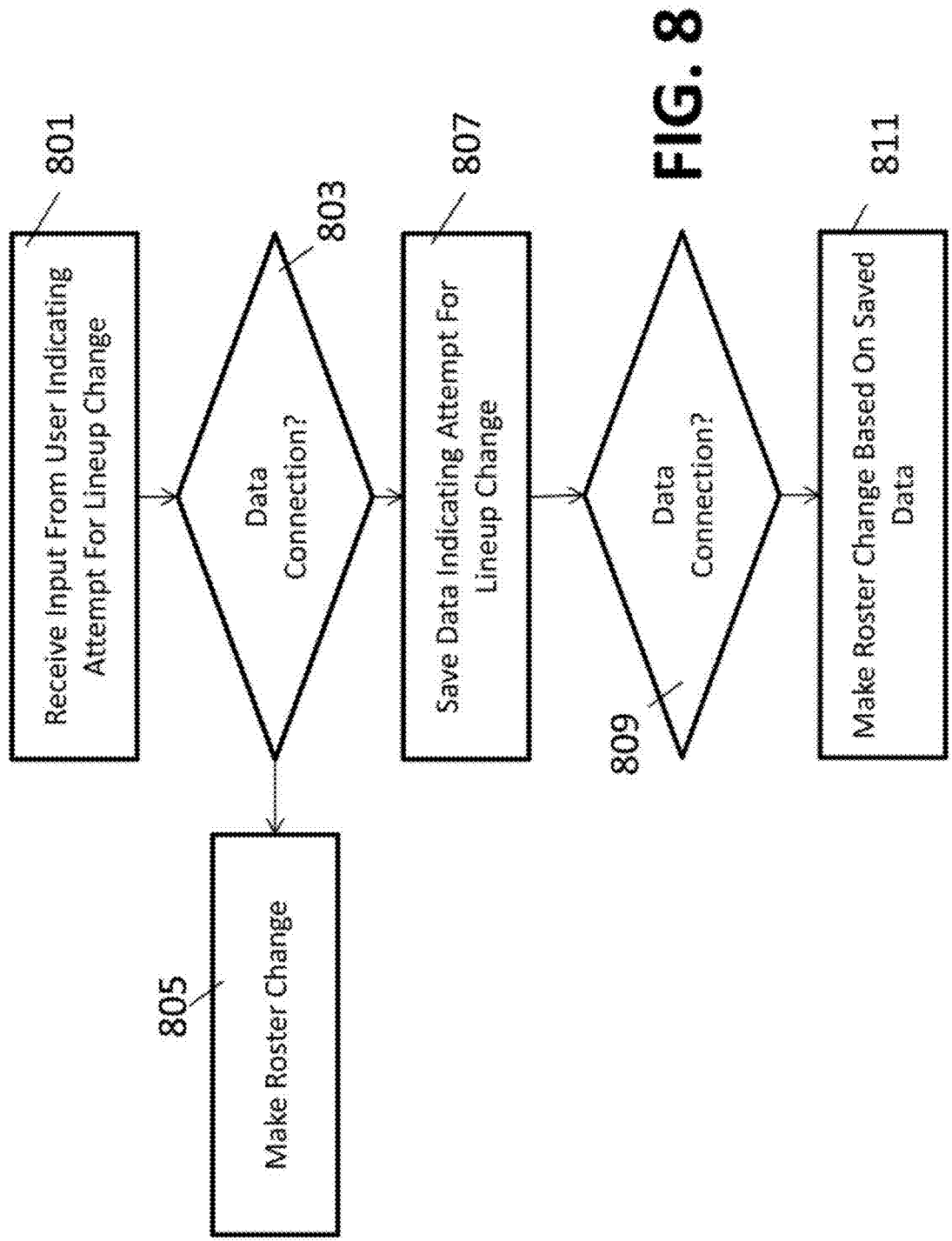

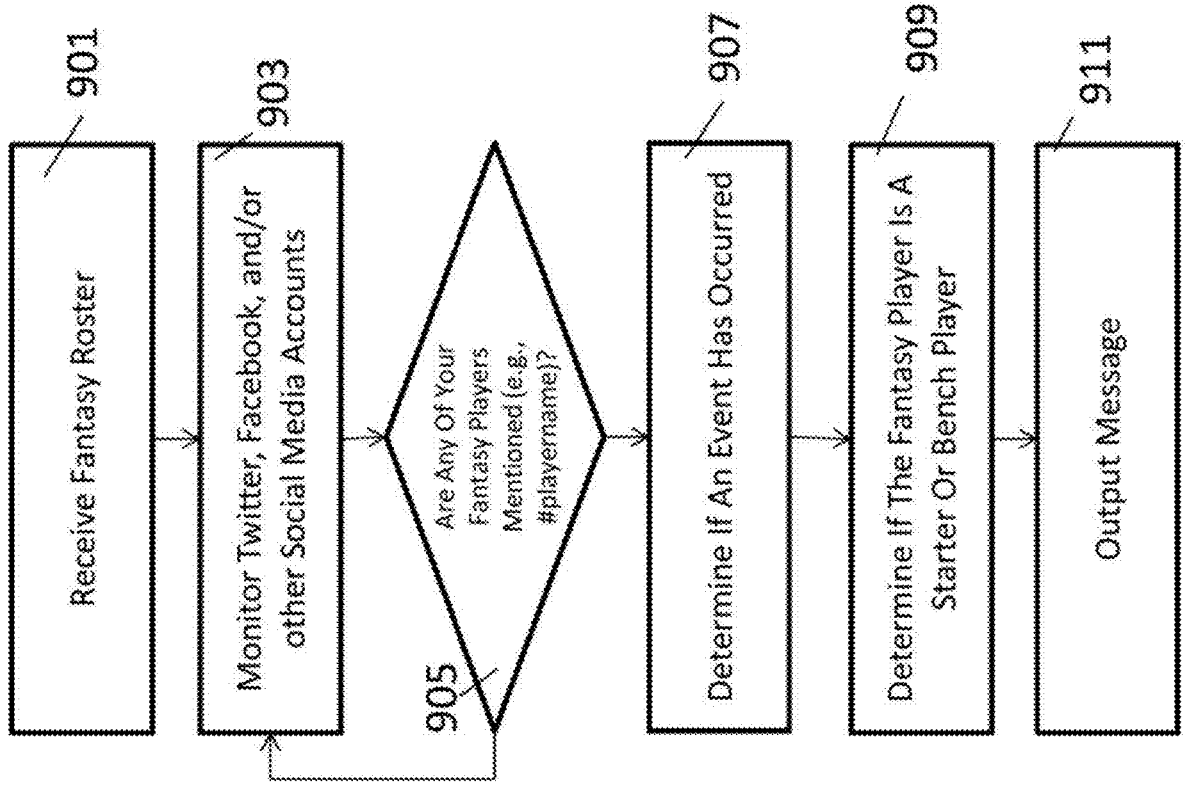

FANTASY SPORTS MANAGER FOR VARIOUS DEVICES

CROSS-REFERENCE TO RELATED APPLICATIONS

This application is a continuation of U.S. application Ser. No. 14/302,931 filed Jun. 12, 2014, the disclosure of which is hereby incorporated in its entirety by reference herein.

TECHNICAL FIELD

The illustrative embodiments generally relate to a fantasy sports management tool and its interaction with electronic devices.

BACKGROUND

Fantasy sports, such as fantasy football, have been known for over a decade. In fantasy sports, users select one or more athletes to be a part of the user's roster, and real-time statistics are tracked and points corresponding to the real-time statistics are awarded to the user. Fantasy sports can be managed by an internet-based interface in which the statistics and corresponding points are monitored and awarded by a server. Users can access this information via the internet.

SUMMARY

A first illustrative embodiment generally discloses a fantasy sports management system on a server comprising a processor and a wireless transceiver. The server configured to communicate sports-related information to a mobile device that includes a fantasy sports management application. The processor is in communication with the wireless transceiver and configured to receive real-time sports information related to the fantasy sports management application on the mobile device. The processor is further configured to receive input requesting the fantasy sports management application to suggest a starter for a roster of a mobile-device user. The processor is further configured to receive roster information from one or more other users of the fantasy sports management application. The processor is further configured to determine substantially similar roster information by comparing the roster information from the one or more other users to the roster of the mobile-device user. The processor is further configured to determine a suggestion for a starter for the roster of the mobile-device user using at least the substantially similar roster information from the one or more other users. The processor is further configured to send the suggestion for the starter of the roster of the mobile-device user to the mobile-device utilizing the wireless transceiver for output on the mobile device.

A second illustrative embodiment generally discloses a fantasy sports management system in an external video output device comprising a processor in communication with one or more transceivers. The one or more transceivers are configured to communicate sports-related information to a remote server that includes a fantasy sports management application. The processor is configured to receive real-time sports information including scores of real-time sporting events. The processor is further configured to output a video signal to an audio-video display based on a user-selected channel or input. The processor is further configured to receive channel information from a broadcast provider that includes a plurality of games airing on a plurality of respective channels. The processor is further configured to receive real-time fantasy sports information via the fantasy sports management application. The processor is further configured to receive roster information via the fantasy sports management application regarding one or more users of the fantasy sports management application. The roster information is based on a starting roster of the one or more users. The processor is further configured to determine if a player on the starting roster is subject to a trigger-event occurring in the player's activity as indicated by the real-time fantasy sports information. The processor is further configured to output a notification providing the user with an option to change the user-selected channel to a channel in which the trigger-event is on in response to the trigger-event and the user-selected channel not showing the game that includes the player on the starting roster that is subject to the trigger-event occurring.

A third illustrative embodiment generally discloses a fantasy sports management system in an external video output device. The fantasy sports management system comprising one or more wireless transceivers configured to communicate sports-related information from a remote server. The fantasy sports management system further comprises one or more digital audio-video transceivers configured to communicate video signals, audio signals, and consumer electronic control data to one or more auxiliary devices. The fantasy sports management system further comprises one or more remote control transceivers configured to communicate input-output controls to and from a remote controller. The fantasy sports management system further comprises one or more microphone inputs configured to receive voice controls from a user to control the external video output device or an auxiliary device. The fantasy sports management system further comprises one or more processor in communication with the one or more wireless transceivers, digital audio-video transceivers, and remote control transceivers. The processor is configured to receive real-time sports information that includes scores of real-time sporting events from the remote server. The processor is further configured to receive input-output controls via wireless signals from a remote interface device. The processor is further configured to receive broadcast information from a broadcaster that corresponds to the real-time sports information via the auxiliary device in communication with the external video output device via the digital audio-video transceiver. The processor is further configured to output a video signal based on the broadcast information to an audio-video display based on a user-selected channel via the digital audio-video transceiver. The processor is further configured to receive channel information from the broadcaster that includes a plurality of games airing on a plurality of respective channels. The processor is further configured to receive real-time fantasy sports information from the remote server via the fantasy sports management application. The processor is further configured to receive roster information from the remote server via the fantasy sports management application regarding one or more users of the fantasy sports management application. The roster information is based on a starting roster of the one or more user. The processor is further configured to output a notification providing the user with an option to change the user-selected channel to a channel in which the trigger-event is on in response to the trigger-event and the user-selected channel not showing the game that includes the player on the starting roster that is subject to the trigger-event occurring.

BRIEF DESCRIPTION OF THE DRAWINGS

FIG. 2 illustrates an exemplary flow chart of an algorithm implemented by the fantasy sports management system relating to sending an alert to a fantasy sports manager based on weather for games being played by players on the manager's roster;

FIG. 3 illustrates an exemplary flow chart of an algorithm implemented by the fantasy sports management system relating to sending an alert to the manager based on a large scoring event;

FIG. 5 illustrates an exemplary flow chart of an algorithm implemented by the fantasy sports management system relating to suggesting a starter based on a comparison of two or more similar rosters;

FIG. 8 illustrates an exemplary flow chart of an algorithm implemented by the fantasy sports management system relating to storing an attempted lineup change for proof of lineup change in the event of a loss of data connection; and FIG. 9 illustrates an exemplary flow chart of an algorithm implemented by the fantasy sports management system relating to of a social media review based on one or more team member on the user's roster.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The disclosure now will be described more fully hereinafter with reference to the accompanying drawings, in which illustrative embodiments of the disclosure are shown. This disclosure, may however, be embodied in many different forms and should not be construed as limited to the embodiments set forth herein. Like numbers refer to elements throughout. As used herein the term "and/or" includes any and all combinations of one or more of the associated listed items.

Figure 1:
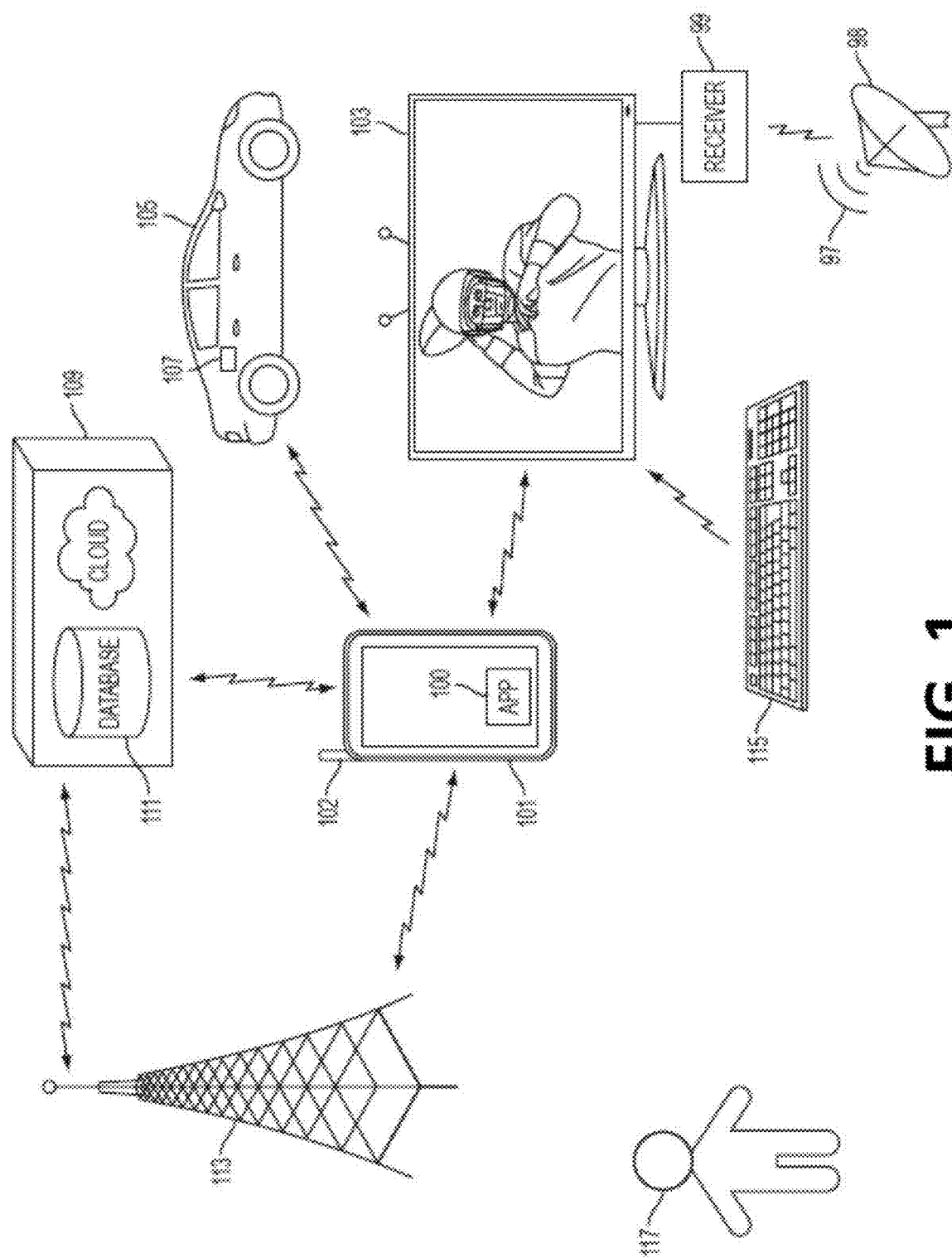
FIG. 1 illustrates an exemplary block topology for fantasy sports management system.

FIG. 1 illustrates an example block topology for a fantasy sports management system. An example of such a fantasy sports management system may include those offered by ESPN, NFL, YAHOO, etc. Although the embodiments relate to fantasy sports in general, the illustrative embodiments herein described below will describe fantasy football for brevity. It should be noted that the embodiments may extend to all types of fantasy sports besides football, including but not limited to, baseball, basketball, hockey, golf, soccer, tennis, arena football, automobile racing, horse-racing, boxing, mixed-martial arts, track and field, softball, Olympic sports, etc. The embodiments may also be used in professional sports, semi-professional sports, collegiate sports, amateur sports, etc. It should therefore be understood that all references to "fantasy football" in this disclosure are intended to encompass all fantasy sports in general.

In fantasy sports, a user has a roster, typically set during a draft that occurs prior to the beginning of the season. During the draft, each user in the fantasy sports league selects players to fill their roster. Once rosters for each of the users are set, the user can set a starting lineup by selecting a certain number of players from his roster to be a starter. The user can change his starting roster at different times during the seasons, usually weekly. When players on the user's starting roster make certain plays that affect their statistics (e.g., score a touchdown, gain yards, make a base hit, etc.), the user receives points correspondingly. The players that are not on the user's starting roster are "bench" players and their statistics do not translate into points for the user until the bench player is converted to a "starter" and placed on the starting lineup.

In the illustrative embodiment, a mobile device 101 may be loaded with an application 100 that is utilized for fantasy sports management. The mobile device may include a visual display to output any contents of the application. Outputs on the mobile device can include, but are not limited to, a visual display and a speaker or stereo system output. The speaker is connected to an amplifier and receives its signal from a processor through a digital-to-analog converter.

The mobile device may be able to output data to a remote device utilizing a wireless transceiver. The data may include video data, audio data, or any other form of data utilized for fantasy sports. Thus, the mobile device may share certain functionality with an external device or vice versa. In one non-limiting example, the mobile device may be in communication with a television 103 that does not include any long-range wireless transceiver to communicate with an off-board network. The mobile device may pair with the television to share its functionality to communicate with an off-board server. Upon pairing with the mobile device, the television may be capable of retrieving external data from various sources to utilize for different applications. The mobile device may pair with any external device to share data or functionality for communicating data.

The mobile device includes a processor is also provided with a number of different inputs allowing the user to interface with the processor. In this illustrative embodiment, a microphone, an auxiliary input (for input), a USB input, a GPS input and a BLUETOOTH input are all provided. An input selector is also provided, to allow a user to select between various inputs. Input to both the microphone and the auxiliary connector is converted from analog to digital by a converter before being passed to the processor.

Output may also be made to a remote BLUETOOTH device such as PND or a USB device such as vehicle navigation device 60 along the bi-directional data streams shown at and respectively.

In one illustrative embodiment, the mobile device 101 uses a BLUETOOTH transceiver to communicate with a different external device (e.g., television, vehicle multimedia system cell phone, smart phone, PDA, computer tablet, computer, or any other device having wireless remote network connectivity). The mobile device may then be used to communicate with a network. In some embodiments, tower 113 may be a WiFi access point. Although BLUETOOTH is utilized in the illustrative embodiment, other forms of wireless communication may be utilized, such as WiFi, WiMax, GSM, LTE, 3G, RFID (e.g. Internation Standard 1443), ZigBEE, etc. Wired communication may suffice as well, including USB, Serial, Firewire, etc.

Additionally, the mobile phone may directly communicate with a different external device, or indirectly utilizing an intermediary device. For example, the mobile device may communicate with a television by sending a signal to a server that is connected to the Internet/World Wide Web. That server may send a signal, representative of a request or instruction or another form of data, to the television. Thus, the television may respond to the signal from the server, essentially acting on the mobile device's communication.

Pairing of a mobile device and the BLUETOOTH transceiver can be instructed through a button or similar input. Accordingly, the CPU is instructed that the mobile phone's BLUETOOTH transceiver will be paired with a BLUETOOTH transceiver in another device.

In one illustrative embodiment, the mobile phone is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

The mobile phone may be utilized to communicate with a television 103 or any other type of video output device, including but not limited to a monitor, projector, tablet, vehicle screen, another cellular phone or mobile device, etc. Although the illustrative embodiments herein described below utilize a television, any video output device mentioned above may be utilized. The television 103 may retrieve a video signal directly from an internal audio/video transceiver/processor (e.g., as found in a "Smart TV") or via an external audio/video transceiver (e.g., within a cable box, a media player [e.g. APPLE TV, ROKU, AMAZON FIRE TV, etc.], satellite receiver, video game system [e.g., XBOX ONE, PLAYSTATION4], matrix receiver [e.g. HDMI, HDBaseT, Component], etc.). The audio/video transceiver may interact with the mobile device or even replace the nomadic device. Further, audio/video transceivers may interact with others. For example, a video game system may interact with a cable box, and thus interact with a television. The interaction may include the exchange of data, applications, software, video signals, audio signals, etc. Additionally, although not mentioned specifically in the illustrative embodiments described below, the audio/video transceiver may operate with all of the functionality of the mobile device. The A/V transceiver 99 illustrated in the figures is intended to encompass one or more of these devices, which can communicate with one another via a wired or wireless connection and with other external devices (e.g., mobile devices, remote controls, tablets, etc.) to exchange the data, applications, software, A/V signals, etc. described above.

Different devices may communicate with each other utilizing an HDMI interface or similar interface (including wireless, e.g., BLUETOOTH or RF). Each device may communicate utilizing Consumer Electronic Control data.

Consumer Electronic Control (CEC) is an HDMI feature that may allow a user to command and control multiple CEC devices that are connected through HDMI by using only one of remote device (e.g. controlling a TV, external media device, and video game console using only the remote control of the TV. CEC may also allow for individual CEC-enabled devices to command and control each other without user intervention. For example, if you power on the external media device, the other devices that may be in use, such as the television and video game console, may turn on. Audio and video data, along with CEC data, may be transmitted over HDMI.

CEC is a one-wire bidirectional serial bus that is based on the CENELEC standard AV.link protocol to perform remote control functions. It was defined in HDMI Specification 1.0 and updated in HDMI 1.2, HDMI 1.2a and HDMI 1.3a (which added timer and audio commands to the bus). USB to CEC adapters exist that allow a computer to control CEC-enabled devices.

Some names for CEC based products include are Anynet+ (Samsung), Aquos Link (Sharp), BRAVIA Link and BRAVIA Sync (Sony), HDMI-CEC (Hitachi), VIERA Link (Panasonic), EasyLink (Philips), and NetCommand for HDMI (Mitsubishi).

Some examples of HDMI-CEC commands include:
One Touch Play (allows devices to switch the TV to use it as the active source when playback starts)
System Standby (enables users to switch multiple devices to standby mode with the press of one button)
Preset Transfer (transfers the tuner channel setup to another TV set)
One Touch Record (allows users to record whatever is currently being shown on the HDTV screen on a selected recording device)
Timer Programming (allows users to use the electronic program guides (EPGs) built into HDTVs and set-top-boxes to program the timer in recording devices like PVRs and DVRs)
System Information (checks all components for bus addresses and configuration) Deck Control (allows a component to interrogate and control the operation (play, pause, rewind etc.), of a playback component (Blu-ray or HD DVD player or a Camcorder, etc.)
Tuner Control (allows a component to control the tuner of another component)
OSD Display (uses the OSD of the TV set to display text, e.g. display fantasy football information on the TV)
Device Menu Control allows a component to control the menu system of another component by passing through the user interface (UI) commands)
Routing Control controls the switching of signal sources
Remote Control Pass Through allows remote control commands to be passed through to other devices within the system
Device OSD Name Transfer transfers the preferred device names to the TV set
System Audio Control allows the volume of an AV receiver, integrated amplifier or preamplifier to be controlled using any remote control from a suitably equipped device(s) in the system The television may communicate with the mobile device utilizing a wireless or wired transceiver. One example of a wireless communication of data is BLUETOOTH. The mobile device may provide data from the fantasy application or other external sources to the television. Thus, the television may be able to mesh or integrate the data with the video output to provide a seamless user experience.

Additionally, the television and/or its transceiver/processor may also communicate data (video, audio, or any other data) to the mobile device. Thus, the television and/or its transceiver/processor may be able to send data related to the currently watched content to the mobile device. The mobile device may be able to utilize this televisions data for various applications. The television may include integrated circuitry to operate as an alternative embodiment to the cellular phone.

The AV transceiver 99 may be in communication with a television network utilizing antennas, mobile satellites 98, or other forms of communication. The AV transceiver may retrieve live or recorded content related to the fantasy sports.

Additionally, the television may be in communication with an input device 115, such as a remote control. Other input devices may include a standard remote control, mobile phone, tablet, touch screen remote, voice recognition microphone, etc. The input device may allow a user to control the television or the video output display. Additionally, the input device may control other devices, such as an AV transceiver 99 or the mobile phone. Additionally, the mobile phone may also have functionality to control the television or the AV transceiver.

The AV transceiver 99 may also retrieve data for usage with fantasy sports applications. Certain content from the fantasy sports applications and the AV transceiver may be output via a television or the video output device. Thus, AV transceiver may output a signal that includes video content and fantasy sports data. Additionally, the mobile device 102 may also output additional data or signals to the video output display.

In another embodiment, mobile device 101 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer).

In still another embodiment, the mobile device is replaced with a cellular communication device (not shown) that is installed to a vehicle. In yet another embodiment, the ND may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor. In the case of certain temporary data, for example, the data can be stored on the HDD or other storage media until such time as the data is no longer needed.

Additional sources that may interface with the vehicle include a personal navigation device having, for example, a USB connection and/or an antenna, a vehicle navigation device 60 having a USB or other connection, an onboard GPS device, or remote navigation system (not shown) having connectivity to network. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices. These devices can be connected through a wireless or wired connection. Auxiliary devices may include, but are not limited to, personal media players, wireless health devices, portable computers, nomadic device, key fob and the like.

Also, or alternatively, the CPU could be connected to a vehicle based wireless router, using for example a WiFi (IEEE 803.11) transceiver. This could allow the CPU to connect to remote networks in range of the local router.

The mobile device may also be in communication with a vehicle 105. The vehicle may include a BLUETOOTH transceiver, or another short-range wireless transceiver, to communicate with the mobile phone. The vehicle 105 may also include a vehicle multimedia system 107 to output data and video content. Although not shown, the vehicle multimedia system and other components may be in communication over a vehicle multiplex network (such as, but not limited to, a CAN bus) to pass data to and from a vehicle computing system (VCS) or components thereof. The mobile phone may retrieve the data received from the vehicle bus for utilization with the fantasy application, or vice versa. Additionally, the vehicle multimedia system may include various other output devices and input devices. Some examples of output may include displays of an RSE system, instrument cluster, multimedia display, speakers, etc. Input may include a touch screen, hard button, rotary switch, haptic device, etc.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VAC to a given solution. In all solutions, it is contemplated that at least the vehicle computing system (VCS) located within the vehicle itself is capable of performing the exemplary processes.

Various embodiments are provided below relating to an interactive fantasy sports management system. In each embodiment, various methods of communication between and amongst a mobile device, a television or other output display, a vehicle, an offsite database, etc. It should be understood that the modes of communication between and amongst each of these described devices and systems to transmit data can be implemented in each of the embodiments. In other words, each described mode of data transmission can apply to any of the embodiments described below, and each embodiment is not intended to be limited to the mode of communication provided in the description relating to that particular embodiment.

FIG. 2 shows an illustrative embodiment for providing a roster alert to the user or a roster change to the user's roster based on weather conditions. The mobile device receives roster information regarding the user's starting lineup and reserve (bench) players based on user input, as previously described. For instance, the mobile device can connect to the internet and retrieve the fantasy roster of the user from an offsite database provided by the fantasy football service provider. The mobile device also receives the time and day of each game played for each respective player on the user's roster. For example, a kickoff time of 1:00 pm EST on Sunday, October $12^{th}$ may be received by the mobile device indicating the time and date in which a player on the user's roster is scheduled to play in his/her game. The mobile device also receives location information corresponding to the site of the game that is scheduled to be played. For example, Cincinnati, Ohio may be received by the mobile device as the city in which Calvin Johnson and his team (Detroit Lions) are scheduled to play their upcoming game. The location information received by the mobile device may include longitude/latitude coordinates, city/state, zip code, street number and name, and the like.

The mobile device and/or the offsite fantasy football service provider may then retrieve weather information that corresponds to the received time, date, and location of the scheduled game for each respective player on the user's roster. For example, the mobile device may utilize its existing weather applications, processor(s), and transceivers to communicate with and receive weather data from offsite weather service providers. In another example, the fantasy football service providers determine the weather conditions for each game site, time and day, and send this information to the mobile device. The fantasy sports application may include an application program interface (API) to communicate with weather applications, or any external applications, to utilize for roster management.

Once weather information is received or determined by the mobile device, the mobile device can indicate the time, day, location, and corresponding predicted weather conditions for each of the players on the user's roster. The CPU on the mobile device or within the fantasy football service provider can then make a determination as to whether poor weather conditions are predicted that necessitate an alert to the user or an automatic roster change to the user's roster based on the weather conditions. Poor weather conditions can be indicated by a plethora of factors, including a chance of rain, snow, hail, high wind speeds, low temperature, etc.

If poor weather conditions are indeed predicted for at least one player on the user's roster, a visual/audio weather notification can be output by the mobile device to alert the users that one of the user's players on the user's roster has a significant chance of playing in poor weather conditions that may negatively affect his statistics for the upcoming game.

In one illustrative embodiment, the user receives a visual alert on his mobile device indicating that an 80% chance of rain showers are forecasted for 1:00 pm EST in Cincinnati, Ohio, corresponding to the time and location that Calvin Johnson (on the user's roster) is scheduled to play. Based on that alert, the mobile device may provide the user with access to his roster so that the user can adjust his/her starting lineup accordingly and, for example, replace Calvin Johnson with another player that is scheduled to play in better weather conditions, as indicated by the mobile device according to methods previously described.

According to at least one embodiment, the mobile device and/or the fantasy football service provider can automatically replace a player in the starting roster scheduled to play in poor weather conditions with a player in the reserve roster scheduled to play in better weather conditions. This may automatically (for example, without user input or with little user input) be accomplished if certain weather conditions exceed a threshold. The thresholds may, for example, be an 80% probability of rain, snow, or other poor weather conditions explained above predicted for the location and game time of the player on the user's starting roster. Based on the threshold for poor weather conditions being met or exceeded, the mobile device and/or fantasy football service provider automatically replaces that starting player with another player from the user's reserve roster that is playing in weather conditions in which the threshold for poor weather is not met.

The mobile device and/or the fantasy football service provider can also allow the user to define the threshold, and also define which individual bench players can be eligible to replace the starting player in the event of poor weather conditions.

Additionally, the mobile device and/or the fantasy football service provider can combine the predicted weather conditions with the predicted score for the players on the user's roster in order to determine an optimal lineup. For example, if Calvin Johnson is predicted to score 12 points, poor weather conditions may not cause Calvin Johnson to be replaced by a player that is only predicted to score 2 points. However, if another player on the user's bench is predicted to score 10 points, the mobile device and/or the fantasy football service provider can substitute that player for Calvin Johnson if the poor weather threshold is met for Calvin Johnson's game.

FIG. 3 is an illustrative embodiment of a flow chart for a "big play" alert. The television may be in communication with an external receiver or mobile device via a wired or wireless connection, or utilize an embodiment as disclosed in FIG. 1. The system may receive scoring information from an off-board server or bureau (e.g. ESPN, YAHOO, etc). The scoring may be received at different time intervals or every update.

The system may then analyze the recent score update from a specific player or team 303. The system may have different flags or parameters set to trigger a "big play alert." Additionally, the system may allow the user to specify when a big play alert has occurred. The alerts may be triggered by various aspects, such as utilizing a specific point increase (e.g. a play that created more than 5 points), a specific length of a pass, run, or a catch (e.g. 25 yard pass, run/catch or more), specific type of field goal (50+ yards), defensive/special teams play (e.g. interception or fumble for a touchdown, kick-off or punt return for a touchdown). The system may also notify a user of a play that allowed an opponent to take a lead. Of course, other sports may utilize other significant plays (e.g. a batter hitting a grand slam, a pitcher pitching a "perfect game", etc.). Additionally, the alerts may be specified by a specific team, player, or game occurring. For example, a user may battle against an opponent that has one starting player remaining going into a Monday night game, with the user holding a small lead over the opponent. The user may set an alert to receive updates for any time of specific points, or even total points accumulated for that day, to notify the user of any points scored in the game. Thus, the user may receive continuous active alerts, eliminating the need for the user to constantly and actively request for his fantasy team scores to be sent to him and comparing them with the points scored by his opponent.

Upon the alert occurring, the system may alert the user's various devices that are linked to the fantasy system 309. For example, upon a big play occurring, an e-mail alert or SMS message may be sent to a mobile device, television, external receiver or car. Thus, the device which receives the alert may output the notification via different output sources (e.g. speakers display, etc.). Furthermore, the alert may include other data, such as a picture or video of the play. The alert may be sent via various wireless or wired connections. In the situation when a score is updated and a big play alert has not occurred, the system may continue to analyze the scoring.

The system may also notify other devices of a big play alert to enable other various features. For example, upon a big play occurring, the system may notify a DVR to schedule a recording of that play for the specific channel. In another embodiment, the system may communicate with the fantasy server requesting data regarding the play. The server may provide audio, video, or picture data that represent the play occurring. The system may send data that the server provided to describe or illustrate the play to the user. For example, if Adrian Peterson runs for a 90 yard touchdown, a video file, audio file, or picture may be streamed or sent to any one of the user's devices. Also, text data describing the play may be sent (e.g. "Adrian Peterson ran for a 90 yard play on a right sweep, breaking a tackle after running over Cliff Avril.").

A threshold may be set by the user or the system that defines what plays are considered "big plays" and worthy of sending the big play alert. In one embodiment, the user or system can define a "big play" as any one scoring event that causes the user's total points to increase by 10 points.

FIG. 4 illustrates one or more embodiment in which a recording system such as a digital video recording (DVR) device, video-to-cloud storage, and the like is included. As will be described below by example, the recording system begins recording based upon factors other than time of day, including, for example, the game and/or play status of a player on the user's roster.

The mobile device is again shown in communication with the offsite facility for sending and retrieving information relating to the user's fantasy football roster. This enables the user to interact with and manage his or her fantasy sports team while the output display displays information related to the fantasy sports along with the actual gameplay, as previously described with reference to FIG. 1.

Figure 4A:
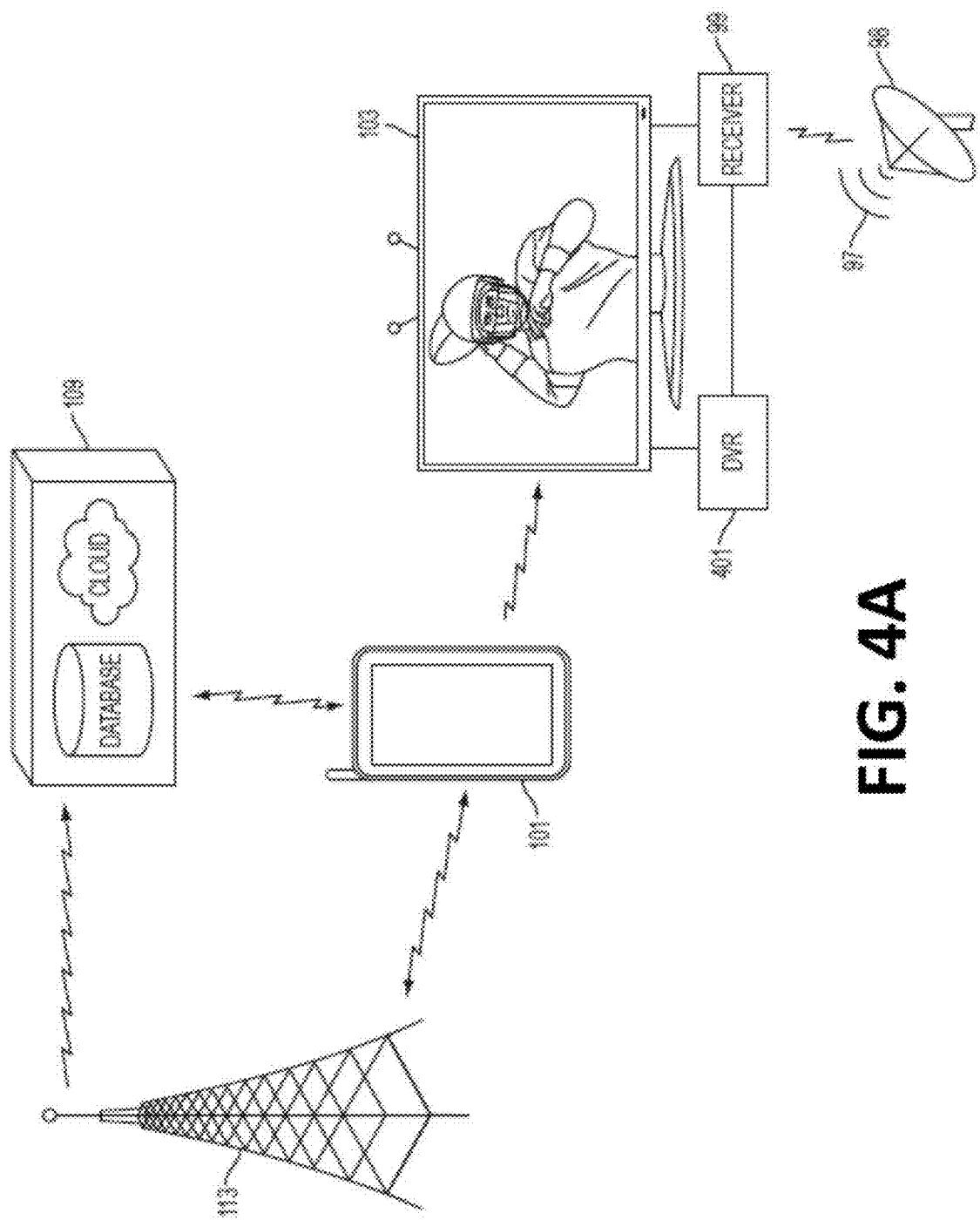
FIG. 4A illustrates an exemplary block topology for the fantasy sports management system.
Figure 4B:
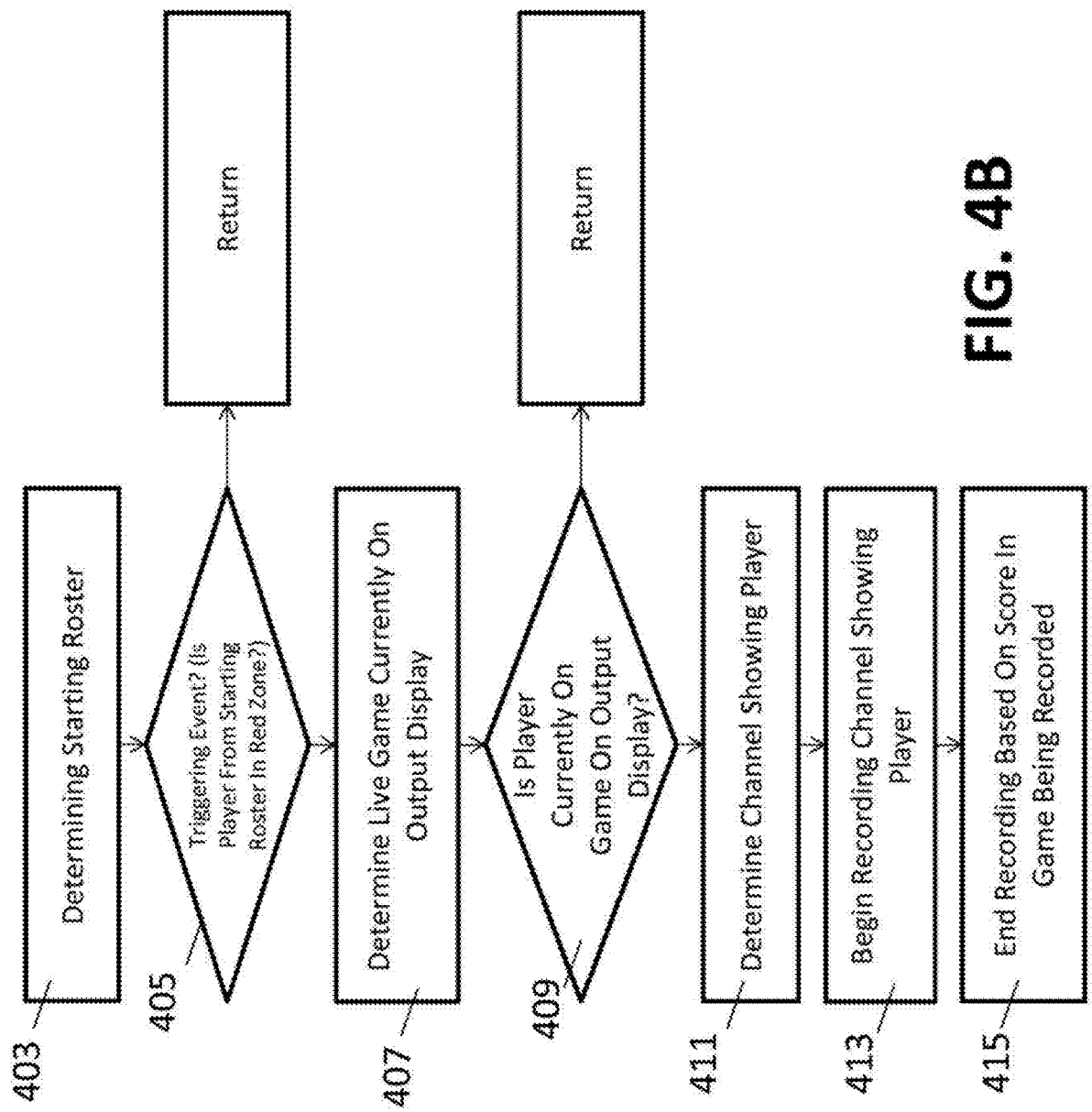
FIG. 4B illustrates an exemplary flow chart of an algorithm implemented by the fantasy sports management system relating to correlating the players on the manager's roster with the channels on which they are playing, and implementing certain functions based on the correlation.

FIGS. 4A-4B illustrate one or more embodiments in which a recording system such as a digital video recording (DVR) device, video-to-cloud storage, and the like is included. As will be described below by example, the recording system begins recording based upon the game and/or play status of a player on the user's roster.

A recording system 401 is in communication with the receiver and/or the output display. The recording system may be a recording device integrated with the receiver and housed within the same housing, or may be external to the receiver and housed within its own housing. The recording system may also be integral within the housing of the output display. The recording system may include its own transceiver or receiver that receives information either directly or indirectly from the mobile device relating to the user's fantasy football roster.

Based upon the status, gameplay, or other triggering event that concerns a player on the user's roster, the recording system begins a recording session on a channel or input source (e.g., application such as an ESPN web-based application that, when activated, airs content through the application) that is showing the player's team's game. For example, the fantasy sports software utilized by the mobile device will cause the mobile device to send a signal that causes the recording system to begin recording based on the triggering event. In one embodiment, the triggering event occurs when a player on the user's fantasy football team enters the "red zone" (i.e., is within 20 yards of the goal line). The triggering event causes the recording system to record a channel on which the player's team is viewable. This can occur whether or not the output display is currently showing channel 202. This allows the user to be provided with recording of gameplay of a channel that is not currently displaying while not interrupting the current game that is shown on the output display.

Once the recording system begins recording based upon the triggering event that concerns the player occurring, an alert or message may be displayed on the output display informing the user that the recording has begun. If the output display is displaying a different channel than the channel that is being recorded, the message displayed on the output display may provide the user with the option to change the channel to view the recorded channel, or remain on the current channel and store the recording for future viewing. The message displayed to the user may also include information regarding the in-game event that defined the triggering event that caused the recording.

The recording system will continue to record the game until a second triggering event occurs. Examples of the second triggering event include a threshold time expiring (e.g., 10 minutes), when the player's team is no longer in the red zone, when the team scores, when the team's opponent obtains possession of the ball, when the (baseball) player is no longer batting, or when other such events occur. The relatively short recording times maintain the amount of data being saved to a minimum, and may be advantageous in situations where recording information storage volume is of importance.

In an example scenario, the user may be watching channel 202 on which the Patriots versus the Colts is being shown. The user may have Calvin Johnson on his roster, who plays for the Lions. The Lions game is available for viewing on channel 204. During the game, the Lions may enter the red zone, or may be attempting to convert on a fourth down, or Calvin Johnson may make a long catch, or may be injured, or other such triggering event may occur. The user is unable to see the upcoming plays that may affect Calvin Johnson's fantasy football score for the user's team since the user is not watching channel 204. However, based upon the triggering event, the recording system begins recording channel 204. Additionally, an alert may then be sent to the user's mobile device or to the output display that (i) alerts the user that recording has begun on channel 204 on which Calvin Johnson is playing, and/or (ii) provides the user with an interactive option to change the channel and begin viewing the gameplay on channel 204. The recording ceases when the Lions no longer have possession of the ball, when the Lions are out of the red zone, or other examples in which the second triggering event occurs indicating the probability of Calvin Johnson scoring being reduced.

It should be understood that the above descriptions of "triggering events" are merely for exemplary purposes only. Other such events may occur that trigger the recording system to begin recording and/or send an alert to the user via the output display. For example, if the user has Devin Hester (who returns punts for the Chicago Bears) on his roster, a triggering event that activates the recording device can be when a team playing against the Bears has a $4^{th}$ down and is likely to punt. If a user has Miguel Cabrera on his fantasy baseball roster, a triggering event that activates the recording device can be when Miguel Cabrera comes to bat. Other triggering events are contemplated that indicate an immediate and increased possibility of fantasy points being scored by the player.

The triggering event can be determined by the mobile device, the receiver, the output device or any other device that can obtain real-time information regarding live football games, as well as information regarding the user's starting roster. The device can then correlate the user's starting roster with the channels that are airing the games that include players from the starting roster, and can record those channels based off of the triggering events.

By using the system exemplified in FIG. 4A, the recording system can also piece together the various recorded clips that affect the fantasy player for future viewing. For example, each time a triggering event occurs that causes a part of a game to be recorded because of activity of the player's team, that clip can be saved either in the recording device itself or in an offsite database. At a later time, the user can use the television service provider or the mobile device to send a signal that causes the recording system to play one or more of the recorded clips. This provides the user with the ability to view all of the clips of his fantasy player in a condensed, organized fashion.

Any or all of the recorded clips or segments can be viewable on the television or on the mobile device. The recording system may cause one or more of the recorded segments to be sent to an offsite database that is accessible for viewing by the mobile device.

FIG. 4B shows an exemplary flow chart illustrating the operation of at least one computing device, at least partially including a computing device within the recording system. At 403, the starting roster is determined in the manner described above. At 405, it is determined if a triggering event (described above) has occurred.

If a triggering event has occurred, the recording system will determine at 407 which channel is currently being displayed on the output display. At 409, if the player subject to the triggering event has a game currently being displayed on the output display, the algorithm will return. Steps 407 and 409 may be optional in some systems; these steps would inhibit a recording event on that channel if it is already being currently viewed by the user.

Based on the triggering event, at 411 the recording system will determine which channel is showing the game in which the player subject to the triggering event is being played. For example, if Calvin Johnson is on the user's roster and the Detroit Lions are in the red zone, the recording system (or one of the devices in communication with the recording system) will determine which channel the Detroit Lions game is being currently aired on. Once the determination is made as to what channel is airing the game, the recording system begins a limited recording session on that channel at 413. The limited recording session continues until another event in the game occurs that reduces the probability of that player scoring in the near future at 415. Such examples of these events include the player actually scoring, the player's team turning the ball over, the player's team exiting the red zone, the player's team scoring, or other such events.

Use of the triggering events (rather than recording the entire game) provides advantages regarding storage space of recording, for example. To further this goal, temporary recording may be provided that records an entire sequence of plays based on the triggering event (e.g., the entire time the Lions are in the red zone, or the entire at-bat of Miguel Cabrera). Once the triggering event is no longer present (e.g., the Lions turn the ball over, or Miguel Cabrera is no longer batting), the recording may cease. By communicating with the recording system and knowing that a temporary recording session began based on the triggering event, the mobile device can then determine if any points were awarded to a player on the user's roster during that recorded session. If so, the recording system can save only the play that resulted in points for the user's roster, and discard the rest of the recording. Alternatively, the entire temporarily-recorded session can be recorded for later viewing.

FIG. 5 illustrates an example flow diagram of the starting player roster suggestion that may be implemented in certain embodiments. The flow chart may be implemented in the various embodiments disclosed in the specification that process information, including but not limited to the server or off-site facility, mobile phone, tablet, television, computer, video game system, digital video output device (e.g. cable box, dish receiver, etc.), digital video recorder, vehicle, etc. The system may output a user's current roster on a display screen of a processing device at 501. The user may be able to view the roster and be allowed to change or edit their roster. Other information may be displayed, such as the game date and time, weather, injury status, etc. The system may also show the percentage of people starting the particular player. Additionally, stats and predicted points may be output as well.

The display screen may also allow the user to activate a setting that allows a user to determine which player is optimal for starting. The system may have a feature that predicts the optimal roster lineup. Additionally, the system may also allow for a "who do I start" feature that may allow a user to select one or more players to compare with other users to determine who would be optimal to start based on the upcoming game of that player. The user may select the player or players to determine who to start at 503. Rather than utilizing pure projections of points to determine who to start, the system may look to other leagues within their fantasy sports server to see another player with a similar roster or predicament. For example, if a user is debating to determine which two running backs to start, and the user has a roster that includes Marshawn Lynch, C J Spiller, Reggie Bush, and Fred Jackson, the system will look to find a similar roster. The system may also look to see the type of roster setting (e.g. number of quarterbacks, running backs, and wide receiver) of the similar roster. Additionally, the system may utilize the scoring system of the league as a factor to determine if the scoring situation may be similar to that of the user utilizing the "Who Do I Start" feature.

The system may also calculate and display all of the total rosters with all select players at 511. The system may allow a user to view the roster and matchup as well of the similar player. The system may protect certain information of the user with similar rosters for anonymity. Additionally, the system may analyze to determine if a waiver wire or free-agent pick (that is available) may be optimal to start.

The system may analyze the available waiver wires or free agents to determine that most users would start the available player over the user's current starter.

The system may also calculate and display the percentage of starting opportunities for each individual player at 513. Thus, if a player may have had an opportunity to start 55% amongst all rosters, but started 95% given the current roster of the user, the user would have insight into determining what other users in the league do in similar situations.

The system may then suggest a starter based on the percentage of starting opportunities for the player or players given the similar rosters or situations at 515.

After gathering information for all rosters that includes those players, a breakdown of percentages may be displayed to determine what other users involved in a similar situation may do. Alternatively, the system may also just show or recommend the positions that the user request advice for. The "Who Do I Start" feature may not only be used for the same position, but also for a "flex" position that allows more than 1 type of position to start. For example, the flex position may allow a running back, tight end, or wide receiver to start. Thus upon activating the who do I start feature, the system may analyze similar rosters that have the same running back, tight end, or wide receiver, to determine who should start in the flex position. Additionally, the feature may be used to determine who to start based on a similar roster of all players. It should also be noted that the data analysis of finding similar rosters may not be limited to only one type of service, such as Yahoo, NFL, CBS, or ESPN, but could collectively utilize the various service provider's data to determine the optimal starting player(s).

Figure 6:
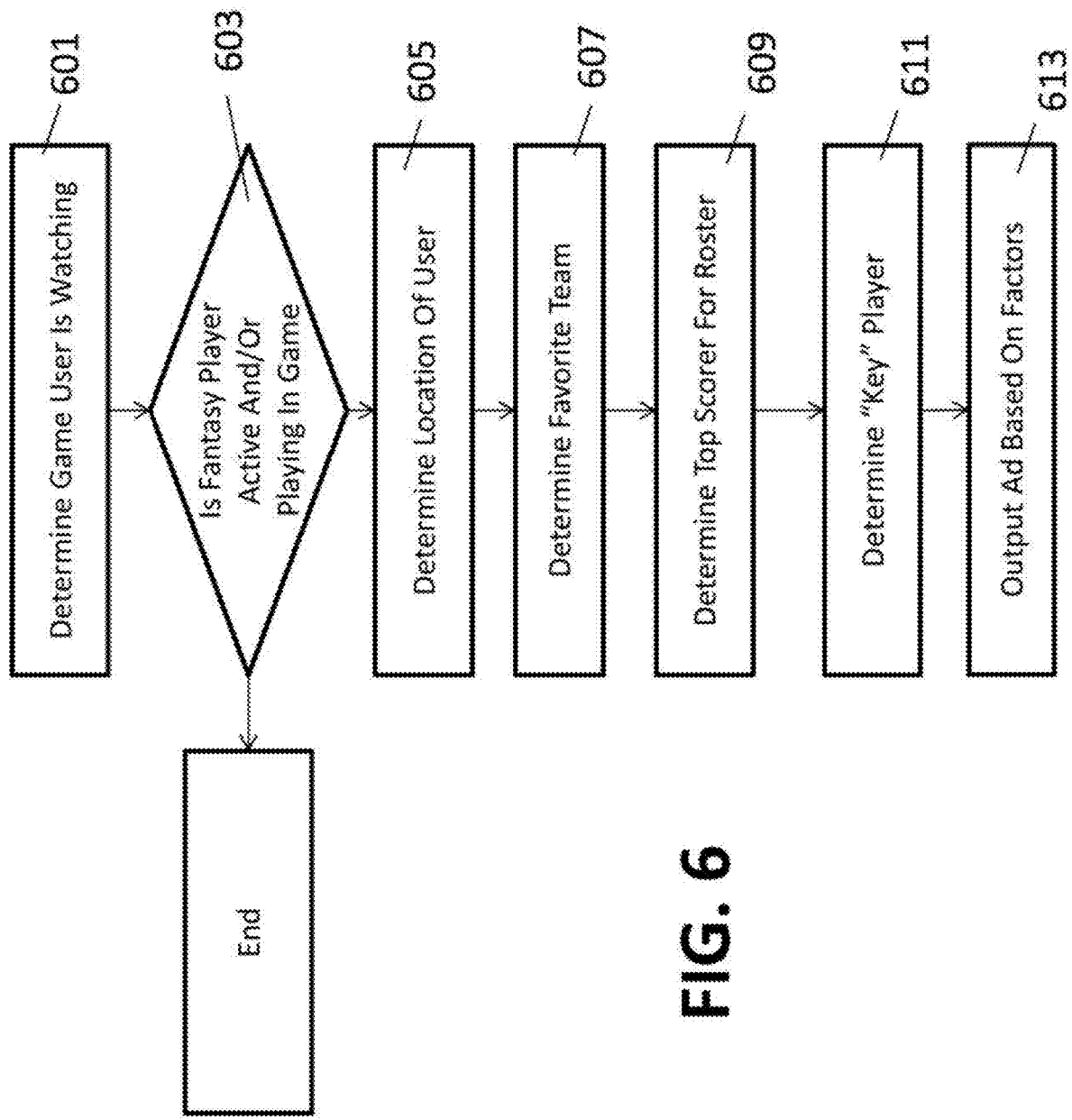
FIG. 6 illustrates an exemplary flow chart of an algorithm implemented by the fantasy sports management system relating to advertising being provided to the user based on the team members on the user's roster and/or based on a live game that the user is watching.

FIG. 6 illustrates an embodiment in which advertising is provided to the user based specifically on the team members on the user's roster and/or based on a live game that the user is watching. Advertisements can be visual and/or audio based, and can be provided on either one or both of the mobile device or the output display. The advertisements can be banner ads at the edge portions of the displays, pop-up windows, audio interruptions in real-time football game audio, and the like.

As will be described, the advertising sent to the user can be based on various factors that include the user's roster. The advertisements can, for example, advertise sportswear (such as jerseys, hats, etc.) or other sports-related objects to be purchased by the user. If the advertisement is shown on the mobile device, the user can click on the advertisement and be directed to a web-based store in which the sports-related objects can be purchased directly from a seller.

As previously described, the mobile device may be in wireless communication with the output display. In one embodiment, the transceiver in the mobile device determines who is on the user's fantasy football roster, and also receives information regarding what real-time football game is being shown based on what channel the output display is currently turned on to. In other embodiments, a GPS unit of the user's mobile device can determine a geographical area in which the user is located, and communicate with the fantasy sports management application to push advertisements to the mobile device relating to the professional sports team or a specific player that is located near the geographical area.

One embodiment of a method employed by the mobile device is provided in FIG. 6. Each of the steps of the method provide factors that can be utilized either in part or cumulatively in an algorithm to provide an advertising company with efficient, user-specific and direct advertising to the user based on the user's fantasy football roster.

At 601, the mobile device determines what game the user is watching based on what channel the output display is tuned to. The mobile device will then relate the active roster on the user's fantasy football roster with the game being watched. The mobile device can therefore determine if one of the active players on the user's roster is being shown on the game at 603.

At 605, the mobile device can utilize its GPS capabilities to determine the location of the mobile device, and thereby the user. This allows local advertisement to be given to the user (e.g., a sportswear store located within 10 miles from the user's location). Another factor in determining effective advertising can be the mobile device determining the user's favorite team. This can be determined at 607 based on the user's own designation of a favorite team to his fantasy football service provider, based on the user's location, etc. Another factor in determining effective advertising is determining the top fantasy scorers on the user's fantasy roster at 609. For example, advertising can be specifically tailored to advertise a jersey or other sportswear that has one of the user's top scorer's name on the items. Yet another factor in determining effective advertising is determining certain "key" players of interest, such as, for example, a player on the user's roster that is playing a Monday Night Football game, a nationally televised game, etc.

Based on the above-referenced exemplary factors, the mobile device can determine what type of advertising to send to the user. For example, the user may be watching a Minnesota Vikings game on the output display, and Adrian Peterson may currently be playing in the game on the output display. The mobile device may also determine that Adrian Peterson is on the user's starting fantasy roster. Based on these two factors, along with the location of the user currently being in Minnesota, the mobile device can send a banner advertisement to the screen of the mobile device that advertises for a football jersey for Adrian Peterson. By pressing the banner advertisement, the user may be directed to a designated NFL shop where he can buy an official Adrian Peterson jersey. The output display may also display such an advertisement, or may automatically access and display a website in which the jersey may be sold.

It should be understood that the above-referenced factors are merely exemplary, and that the mobile device may output an advertisement based on only some of these factors. However, in preferred embodiments, the advertisement is at least based on the user's fantasy roster. In other embodiments, the mobile device can send information containing the data described above such that another external device can populate an advertisement. In other embodiments, the mobile device can determine advertisements based on the GPS or fantasy-team-specific data described above, populate data regarding an advertisement, and push the advertisement to an external device in communication with the mobile device.

Figure 7:
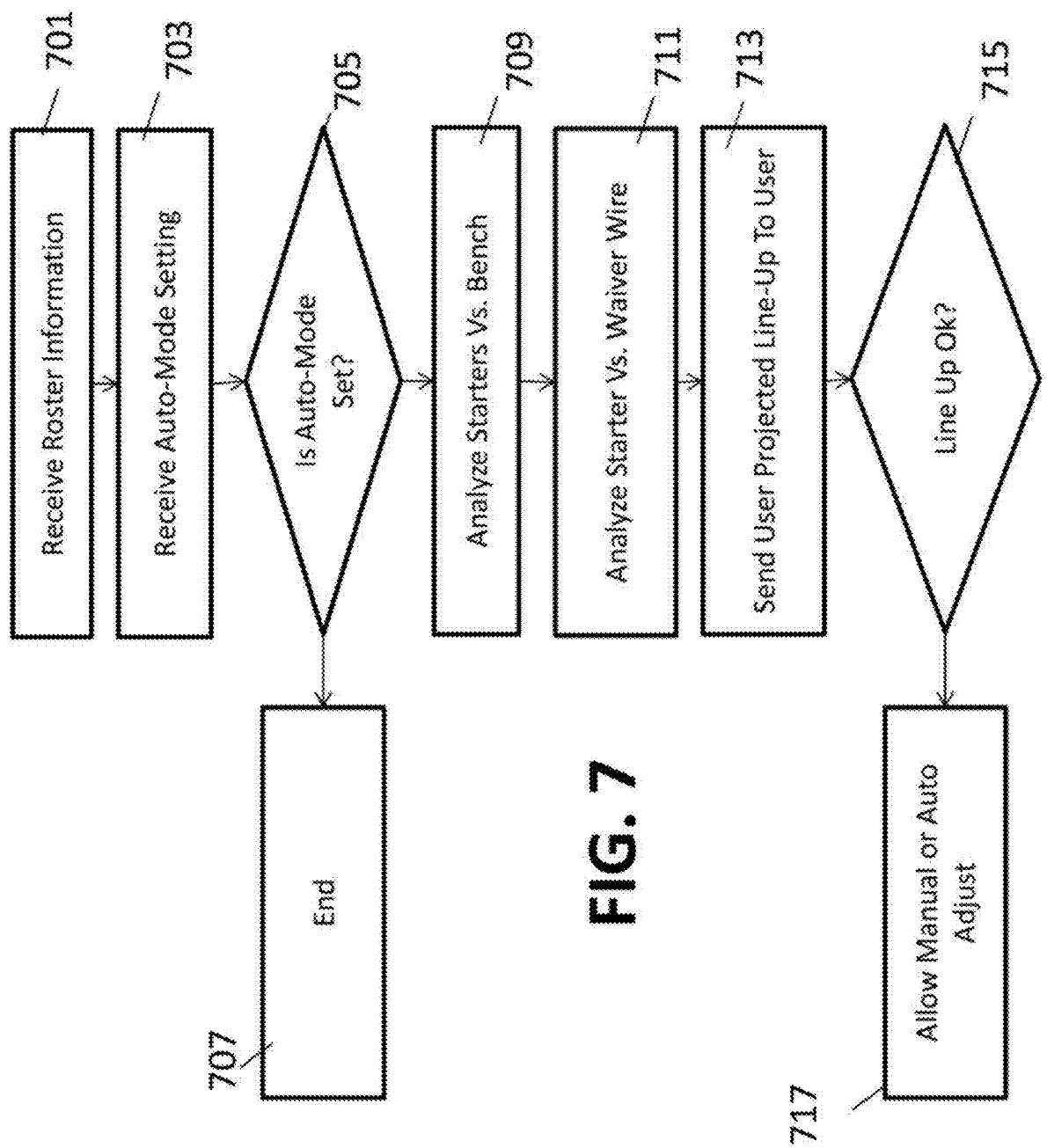
FIG. 7 illustrates an exemplary flow chart of an algorithm implemented by the fantasy sports management system relating to an automatic roster selection.

FIG. 7 illustrates an example of a flow chart of an automatic roster selection. The system may receive the roster information of a user at 701. The system may analyze the current starters and the available bench players on the roster, as well as any free agents or players on the waiver wire. The processing of FIG. 7 may be accomplished at any of the devices previously listed, including but not limited to, the television, cellular phone, off-board server, DVR, cable or satellite receiver, media player, computer, etc. Additionally, processing may be divided between the numerous devices.

The system may receive the auto-mode setting from the user at 703. The auto-mode feature may include various types of features, such as an "AUTO ROSTER ON" feature or a "VACATION MODE" setting that may help the user to set line-ups when the user is not available to do so. Various options may be provided. For example, the auto roster feature may automatically change the user's starting roster to optimize the current week's matchups, yet the vacation mode may be more fully featured to allow the benching of players that are injured and pick-up of optimal waiver-wire picks. Other combination of features may be utilized in any form. Additionally, the user may be able to customize each feature than can be turned on or off for automatic adjustment. For example, some features may include auto-lineup-setting, auto-dropping of an injured player, automatic waiver wire pick-up, auto-dropping of a poor player performer, etc. Additionally, some embodiments may send a message to the user before actually performing the automatic adjustment for each feature for approval by the user. In one example, the system may send a message, e-mail, or notification that the system suggests dropping Titus Young (WR) of the Detroit Lions. In another example, the system may notify the user to add Joique Bell (RB) to their roster in place of Titus Young due to, for example, a favorable matchup against a poor rushing defense. Upon confirmation or a cancellation of the user, the system may either perform or ignore the system's suggestion.

The system may also determine if the user activated an automatic roster setting feature at 705. The system may evaluate each and every auto setting feature, such as but not limited to auto-setting, auto-dropping of an injured player, automatic waiver wire pick-up, auto-dropping of a poor player performer, etc. If the system determines that no setting is activated, the system will ignore the auto-setting feature at 707 and utilize the user's manual input. Upon the system determining that the setting is activated, the system will utilize each feature to optimize the user's roster.

An analysis of the starters versus the bench players at 709 may be utilized for certain features. For example, activation of the auto dropping of an injured player or auto-roster feature may activate this feature. In one example, if a player is deemed to be on an injured reserve list, the system may drop the player and evaluate the bench players to start. In another embodiment, the system may analyze whether the player's bench roster may include optimal players. To determine if the bench roster includes the optimal roster, the system may evaluate the bench players projected points for the week, analyze the matchup of the player, the weather matchup, and/or analyze the roster of other users in the league to determine optimal starters utilizing the illustrative embodiments disclosed with respect to FIG. 5 above. Additionally, the other embodiments disclosed throughout the specification may be utilized to determine the optimal starter. If the system determines that a specified percentage of other users that have a particular player that is on the user's roster, and the other users are starting that particular player, the auto-lineup may automatically start the player for the user. For example, if the system determines that other user's rosters in other fantasy leagues start a player that is benched on the user's current roster, the system may automatically convert the player on the user's roster from being benched to starting. Additionally, a user may customize a threshold percentage of when the system may select the player to convert from benched to start. For example, the user can customize the system such that it starts a bench player that is starting in more than 75% of other user's roster. In some embodiments, the system can compare two or more players on the roster that are shared by other users of other fantasy leagues. By comparing two or more identical players on different rosters, the system can determine that two rosters are generally similar. If another user's roster is generally similar to the user's roster, the system can automatically change the user's roster (or provide a notification) such that the user's roster is more aligned with the generally similar other user's roster. For example, if the user has four particular players that are all found in 5000 other user's rosters in other fantasy leagues, the system can determine the percentage of those generally similar rosters that are starting one of the four particular players, and if that particular player is not on the user's starting lineup, the system can notify or automatically change the user's roster to align with the majority of the 5000 other user's roster that indeed have that particular player starting.

An analysis of the starters versus the waiver at 711 may also be included. For example, the system may determine that a player available on waiver wires or free agency may be a better starter than the user's current player. For example, if a player on waiver wires or free agency is starting more often on other user's rosters than a current player, the system may suggest the waiver wire. Additionally, the system may analyze that the projected points for the waiver wire or free agent pick-up is also optimal. Additionally, other factors disclosed through the specification may be used to determine whether the waiver wire/free agent pick is optimal, such as but not limited, to the match-up, weather, etc.

Upon determining the optimal roster line-up or suggestion, the system may send the projected line-up to the user at 713. The system may display the optimal roster to the user and ask for confirmation in certain embodiments. However, the auto-line up feature also will simply set the user roster without any human intervention for certain embodiments. The system may include a setting to ask for confirmation to set the roster or to simply automatically set the roster. In an embodiment where the system requires user confirmation, the system will display a message requesting to accept or decline the systems proposed roster changes at 715. If the user declines, the system may not accept the settings and simply keep the user's original roster setup at 717. However, if the system accepts the proposed roster changes, the system will automatically adjust the lineup based on the changes.

FIG. 8 illustrates one embodiment of the present disclosure in which an attempt to change a roster is saved when the mobile device is not capable of transmitting data. For example, a user may want to change his fantasy roster or starting lineup before a predetermined deadline for the scheduled matchup for that week. If the user misses the deadline due to poor service by his mobile device, the user may be prevented from subsequently adjusting his roster or lineup. The embodiment illustrated in FIG. 8 allows the user to make the roster or lineup changes while in a poor data reception area, and automatically save the updated roster or lineup to allow for a subsequent lineup or roster change after the predetermined deadline has passed.

At 801, the mobile device receives an input from the user indicating an attempt by the user to change his starting lineup on his fantasy football roster. This attempt may take place prior to a predetermined deadline for making such lineup changes. The predetermined lineup change deadline may be, for example, a time in which the first game of the week starts, or a time in which an individual game starts in which a player on the user's starting roster is scheduled to play.

At 803, the mobile device attempts to connect to the network and database according to methods previously described. If there is a sufficient data connection, the roster change is made according to the user's attempted and desired roster change at 805. However, if it is determined that no data connection is available that is sufficient enough to translate the user's desire to change the starting roster into an actual change in the user's starting roster, the method proceeds to 807.

At 807, several optional procedures are available that can save or record the user's attempted roster change that can allow the user to prove his attempt at a roster change before the deadline, or to enable the fantasy football service provider to make the subsequent roster change even after the predetermined deadline has passed. Data may be saved on the mobile device that indicates the attempt by the user to change his starting roster. This data may be embedded within the application on the mobile device for later retrieval when the mobile device obtains a sufficient data connection. A data may also include a composing of a text message, email, social media posting, or other form of communication that may be automatically composed and time-stamped to indicate the user's attempt to change the roster before the predetermined deadline. The mobile device may also automatically take a screen shot of the attempt to change the lineup and timestamp the picture, evidencing the attempt by the user to change his lineup before the expiration of the predetermined deadline. Other embodiments are contemplated in which data or information is saved on the mobile device for evidence of an attempt to change the roster; these embodiments should be understood to be within the scope of the present disclosure.

Once the data is saved on the mobile device, the mobile device continuously checks for a data connection through the network to the fantasy football service provider at 809. Once a sufficient data connection is made at 811, various actions may be taken. The roster change may automatically be implemented on the user's roster, even if the predetermined deadline has lapsed. This may be enabled by the application on the mobile device (or the fantasy football service provider's servers in general) extracting the saved data from the mobile device that indicates the attempted roster change. A rule may be written into the fantasy football service provider rules such that certain roster changes may be made after the deadline only upon receiving data of an attempt to change a roster prior to the expiration of the deadline while the user has an insufficient data connection. Thus, based on the saved data on the mobile device, the user's roster is automatically changed after the deadline by either the application on the mobile device, any device in communication with the mobile device, or the fantasy football service provider. Alternatively, the saved data may be sent manually or automatically (based on establishing a sufficient data connection) to a member of the league (e.g., the commissioner) that evidences the attempt to make a lineup change. The commissioner can then decide to implement the attempted roster change and manually retroactively change the user's roster after the deadline has lapsed.

FIG. 9 illustrates an example flow diagram of a social media review based on one or more team member on the user's roster. The social media review may allow the user to determine if personal events are taking place in a player's life that may affect their performance on game day. The social media information may be used so that the user may make changes to their roster based on this information. In at least one embodiment, the social media review may provide up-to-date information regarding a play made during a game that may include one or more team members on the user's roster. The method may be implemented using software code contained within one or more controllers. In other embodiments, the method may be implemented in other controllers executed on a mobile device, or distributed amongst multiple controllers communicating in a network.

The method of monitoring one or more social media feeds while communicating with fantasy sports management application may be implemented through a computer algorithm, machine executable code, or software instructions programmed into a suitable programmable logic device(s) of the mobile phone, personal computer, laptop, and/or tablet. Although the various operations shown in the flowchart diagram appear to occur in a chronological sequence, at least some of the operations may occur in a different order, and some operations may be performed concurrently or not at all.

In operation 901, the fantasy sports management application may receive a fantasy roster based on the one or more fantasy players selected on your fantasy sports team. The fantasy sports management application may communicate with one or more social media accounts to search on information based on one or more fantasy players.

In operation 903, the fantasy sports management application may monitor social media accounts including, but not limited to, TWITTER, FACEBOOK, INSTAGRAM, and/or other social media accounts. The fantasy sports management application may determine if any of your fantasy players are mentioned at the one or more social media sites in operation 905.

For example, the fantasy sports management application may monitor TWITTER by searching key words in hashtags and/or account holder names. The fantasy sports management application may determine if an event has occurred to the one or more fantasy players on the manager's roster based on social media information as shown in operation 907. In one example, if the account holder's social media name is referred to a number of times exceeding a threshold (e.g., 100 times) within a certain time threshold, it may be determined that an event occurred relating to the player. The event occurred relating to the player may include, but is not limited to, an injury or other event that may affect his ability to play. In a particular example, if Calvin Johnson's TWITTER account (@Bigplaycj) is referred to 101 times (e.g., by re-tweeting information with his name associated in the tweet) during a certain time threshold (e.g., within a half hour before the game starts), this may indicate that an event has occurred relating to Calvin Johnson and his ability to play. An alert can then be sent to the manager (i.e., user) of the roster associated with Calvin Johnson. An alert can also be sent to the manager of the roster giving the user the option to change his starting roster such that Calvin Johnson is moved from a bench player to a starter (or vice versa).

In addition to or in combination with this number-of-times-mentioned threshold, the time threshold may be present that, if exceeded, causes the alert to be sent to the manager. In one example, if Calvin Johnson's TWITTER account is referred to 101 times within a 30-minute window, the alert may be sent to the user of the fantasy sports management application. In another embodiment, if the social media monitoring indicates that the player's social media account has been referenced one or more times within a time window or a time threshold (e.g., within 2 hours before the beginning of the game), the alert may be sent to the user. Other embodiments are contemplated in which the social media is monitored, references to the players on the user's roster are correlated to the user's roster, and alerts may be sent to the user based on a positive correlation.

In operation 909, the fantasy sports management application may determine if the messages related to the one or more team members is a starter or bench player on the user's roster. For example, a player may be mentioned in a news article posted on a FACEBOOK feed, and the fantasy sports management application may determine if this player is a starter on your roster to inform you of this information. The fantasy sports management application may output a message to you such that it provides up-to-date information about the one or more team members on your fantasy team in operation 911.

In another example, the fantasy sport management application may include one or more configuration tables to define the one or more team member social media names. The fantasy sports management application may receive the user's social media account information to monitor the one or more team members on the user's roster. The fantasy sports management application may notify the user that a team member is being mentioned in social media site. The fantasy sports management application may generate and transmit a message to the user notifying the user of the social media information. The message may include, but is not limited to, a team member, what was mentioned, and a link to view the social media information.

In another embodiment, the system may analyze the player's name in a combination with another keyword a certain amount of times. Certain keywords may trigger a request to alert users of the players name and keyword being mentioned. The alert may include actual feedback of a social media status update (e.g. tweet, FACEBOOK status update, etc.) from a social media account. For example, the system may be configured to include a determination of how many times a player's name is combined with the word "INJURY" or "HURT" to predict an injury to a player. In another instance, other keywords can be used to determine an impact to a player (e.g. "DIVORCE," "DEATH," "ACCIDENT," "ARRESTED," "DRUGS," "STEROIDS," "PED," "MISTRESS," "EXTORTION," "COMBINE," etc.). Thus, any off-field issues can be identified to inform fantasy owners or potential owners of the players. In certain circumstances, the system may include a flag to indicate a verified or reliable social media account (e.g. ESPN, Local News, specific sports broadcasters, etc.). Thus, the verified social media account can output one of the actual status updates regarding the player to show the user what exactly is being broadcast about the player. Further, the flag for a reliable or verifiable source may facilitate the system to have confidence that the outputted status update is reliable.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

What is claimed is:

1. A fantasy sports management system comprising:
one or more transceivers configured to communicate sports-related information to a remote server that includes a fantasy sports management application; and
one or more processors in communication with the one or more transceivers and configured to:
receive real-time sports information of a real-time sporting event,
output a video signal to an audio-video display based on a user-selected channel or input source,
receive real-time fantasy sports information via the fantasy sports management application,
receive roster information via the fantasy sports management application regarding a starting roster of one or more users of the fantasy sports management application,
determine if a player on the starting roster is subject to a trigger event as indicated by the real-time fantasy sports information, and
in response to the trigger event and the user-selected channel or input source not airing the game that the player is playing in, output a notification providing the user with an option to view the user-selected channel or input source in which the game that the player is playing in is airing on.

2. The fantasy sports management system of claim 1, wherein occurrence of the trigger event is made in response to the one of the plurality of players entering a red zone in the real-time sporting event.

3. A fantasy sports management system, comprising:
a transceiver configured to:
receive information regarding a fantasy sports league that includes a plurality of players, and
receive real-time statistical information regarding the plurality of players participating in a real-time sporting event; and
one or more processors communicatively coupled to the transceiver and either collectively or individually programmed to:
determine an occurrence of a trigger event based on the real-time statistical information of one of the plurality of players exceeding a threshold, determine that the one of the plurality of players is on a roster of a user within the fantasy sports league, and output a notification on a video display of a mobile device of the user in response to (i) the occurrence of the trigger event and (ii) a determination that the video display of the mobile device is not currently displaying the real-time sporting event that the one of the plurality of players is participating in.

4. The fantasy sports management system of claim 3, wherein the notification output on the video display includes an option to view the real-time sporting event that the one of the plurality of players is participating in.

5. The fantasy sports management system of claim 3, wherein the determination of the triggering event occurring is made in response to the one of the plurality of players entering a red zone in the real-time sporting event.

6. A fantasy sports management system for a mobile device, comprising:

a transceiver configured to communicate sports-related information to the mobile device that includes a fantasy sports management application enabling a user of the mobile device to manage a roster of sports players including a starting roster; and one or more processors in communication with transceiver and configured to:

receive real-time sports information including scores of a real-time sporting event;

output a streaming video of the real-time sporting event to the mobile device based on a web-based input source, wherein a player on the starting roster is playing in the real-time sporting event;

receive roster information via the fantasy sports management application regarding the starting roster of the user; and in response to (i) a trigger event associated with the player on the starting roster of the user as indicated by the real-time sports information of the player, and (ii) the web-based input source not displaying on the mobile device the real-time sporting event that the player is playing in, output a notification including (i) a description associated with the trigger event, or (ii) an option to view the real-time sporting event that the player is playing in via streaming video from the web-based input source.

7. The fantasy sports management system of claim 6, wherein the notification includes (i) a description associated with the trigger event, and (ii) an option to view the real-time sporting event that the player is playing in via streaming video from the web-based input source.

8. The fantasy sports management system of claim 6, wherein the notification is output on the display of the mobile device.

9. The fantasy sports management system of claim 6, wherein the notification includes an alert that is output on a speaker.

10. The fantasy sports management system of claim 6, wherein the notification may be customized by the user.

* * * * *